(12) United States Patent
Chen et al.

(10) Patent No.: US 9,749,039 B1
(45) Date of Patent: Aug. 29, 2017

(54) PORTABLE CONNECTION DIAGNOSTIC DEVICE

(71) Applicant: Amazon Technologies, Inc., Reno, NV (US)

(72) Inventors: Po-Chun Chen, Herndon, VA (US); David Brian Lennon, Reston, VA (US); Patrick Brigham Cullen, Herndon, VA (US); Daniel Thomas Robinson, Herndon, VA (US); Jawash Mohamed, Reston, VA (US); Alexander Justin Penney, Centreville, VA (US); Kevin Christopher Miller, Herndon, VA (US); Marwan Salah Oweis, Olney, VA (US)

(73) Assignee: Amazon Technologies, Inc., Seattle, WA (US)

( * ) Notice: Subject to any disclaimer, the term of this patent is extended or adjusted under 35 U.S.C. 154(b) by 581 days.

(21) Appl. No.: 13/913,763

(22) Filed: Jun. 10, 2013

(51) Int. Cl.
*H04B 10/07* (2013.01)
*G06F 21/30* (2013.01)

(52) U.S. Cl.
CPC .............. *H04B 10/07* (2013.01); *G06F 21/30* (2013.01)

(58) Field of Classification Search
None
See application file for complete search history.

(56) References Cited

U.S. PATENT DOCUMENTS

| | | | |
|---|---|---|---|
| 5,748,629 A | 5/1998 | Caldara et al. | |
| 6,639,919 B2 | 10/2003 | Kroninger et al. | |
| 7,107,312 B2 | 9/2006 | Hackbarth et al. | |
| 7,292,577 B1 | 11/2007 | Ginjpalli et al. | |
| 7,327,682 B2 | 2/2008 | Gandhi et al. | |
| 7,359,322 B2 | 4/2008 | Khurana et al. | |
| 7,577,154 B1 | 8/2009 | Yung et al. | |
| 7,623,784 B1 * | 11/2009 | Pan | H04B 10/07 398/58 |
| 7,734,516 B2 | 6/2010 | Barnum et al. | |
| 7,743,001 B1 | 6/2010 | Vermeulen et al. | |
| 7,933,230 B2 | 4/2011 | Sato | |
| 7,970,903 B2 | 6/2011 | Oeda | |
| 2001/0022837 A1 | 9/2001 | Vasell et al. | |
| 2003/0074443 A1 | 4/2003 | Melaku et al. | |
| 2003/0236745 A1 | 12/2003 | Hartsell et al. | |

(Continued)

OTHER PUBLICATIONS

"Optifiber Pro OTDR," [online]. Fluke Corporation, 2006-2013. [retrieved on Aug. 28, 2013]. Retrieved from the Internet: <URL: http://www.flukenetworks.com/datacom-cabling/fiber-testing/optifiber-pro-otdr>.

"LinkRunner AT Network Auto-Tester," [online]. Fluke Corporation, 2006-2013. [retrieved on Aug. 28, 2013]. Retrieved from the Internet: <URL: http://www.flukenetworks.com/enterprise-network/network-testing/LinkRunner-AT-Network-Auto-Tester>.

(Continued)

*Primary Examiner* — Uyen Chau N Le
*Assistant Examiner* — Chad Smith
(74) *Attorney, Agent, or Firm* — Davis Wright Tremaine LLP

(57) ABSTRACT

A portable device is brought into a data center for testing connectivity between a customer and a service provider. A user of the device uses the device to requests ticket and customer information from a service provider in order to obtain more information about a particular task. The user plugs a cable into the device and performs a series of diagnostic tests on the connection. The device is configured to display the results of the diagnostic tests and any associated errors. The user of the device performs one or more actions based on the results of the diagnostic tests.

24 Claims, 10 Drawing Sheets

(56) References Cited

U.S. PATENT DOCUMENTS

| | | |
|---|---|---|
| 2006/0198634 A1* | 9/2006 | Ofalt .................... H04B 10/077 398/16 |
| 2007/0067424 A1 | 3/2007 | Raciborski et al. |
| 2007/0135109 A1 | 6/2007 | Walter et al. |
| 2008/0276085 A1 | 11/2008 | Davidson et al. |
| 2008/0298374 A1 | 12/2008 | Rhoades et al. |
| 2009/0070235 A1 | 3/2009 | Mehta et al. |
| 2009/0112735 A1 | 4/2009 | Viehmann et al. |
| 2009/0192945 A1 | 7/2009 | Perpina et al. |
| 2009/0216889 A1 | 8/2009 | Hadi |
| 2009/0276771 A1 | 11/2009 | Nickolov et al. |
| 2009/0300635 A1 | 12/2009 | Ferris |
| 2010/0027552 A1 | 2/2010 | Hill |
| 2010/0039959 A1 | 2/2010 | Gilmartin |
| 2010/0111093 A1 | 5/2010 | Satterlee et al. |
| 2010/0125664 A1 | 5/2010 | Hadar et al. |
| 2010/0131649 A1 | 5/2010 | Ferris |
| 2010/0131948 A1 | 5/2010 | Ferris |
| 2010/0195540 A1 | 8/2010 | Kerr et al. |
| 2010/0226254 A1 | 9/2010 | Kerr et al. |
| 2010/0226280 A1 | 9/2010 | Burns et al. |
| 2010/0280934 A1 | 11/2010 | Kerr et al. |
| 2010/0319004 A1 | 12/2010 | Hudson et al. |
| 2010/0332262 A1 | 12/2010 | Horvitz et al. |
| 2011/0016028 A1 | 1/2011 | Toure et al. |
| 2011/0066752 A1 | 3/2011 | Lippincott et al. |
| 2011/0131335 A1 | 6/2011 | Spaltro et al. |
| 2011/0131647 A1 | 6/2011 | Sanders et al. |
| 2011/0154212 A1 | 6/2011 | Gharpure et al. |
| 2011/0179162 A1 | 7/2011 | Mayo et al. |
| 2011/0231899 A1 | 9/2011 | Pulier et al. |
| 2012/0130873 A1 | 5/2012 | Morgan |
| 2013/0156093 A1 | 6/2013 | Vonog et al. |

OTHER PUBLICATIONS

"Optifiber Pro OTDR," 2006-2013, [retrieved Aug. 26, 2013], 3 Pgs., Fluke Corporation, http://www.flukenetworks.com/datacom-cabling/fiber-testing/optiflber-pro-otdr.

"LinkRunner AT Network Auto-Tester," 2006-2013, [retrieved Aug. 26, 2013], 3 Pgs., Fluke Corporation, http://www.flukenetworks.com/enterprise-network/network-testing/LinkRunner-AT-Network-Auto-Tester.

International Search Report and Written Opinion mailed Feb. 5, 2013, in International Application No. PCT/US2012/66517 filed Nov. 26, 2012.

Cisco, "Network Virtualization—Network Admission Control Deployment Guide" Cisco Systems, Inc., 2007, 14 pages.

Rekhter et al., "A Border Gateway Protocol 4 (BGP-4)," Standards Track, The Internet Engineering Task Force (IETF), Jan. 2006, The Internet Society, retrieved from the Internet http://toold.ietf.org/pdf/rfc4271.pdf, 105 pages.

U.S. Appl. No. 13/306,801, filed Nov. 29, 2011, "Interfaces to Manage Last-Mile Connectivity for Direct Network Peerings," Miller et al., 76 pages.

U.S. Appl. No. 13/330,449, filed Dec. 19, 2011, "Differential Bandwidth Metering for Networks With Direct Pee Rings," Furr et al., 76 pages.

U.S. Appl. No. 13/330,438, filed Dec. 19, 2011, "Dynamic Bandwidth Management Using Routing Signals in Networks With Direct Peerings," Miller et al., 74 pages.

U.S. Appl. No. 13/335,465, filed Dec. 22, 2011, "Interfaces to Manage Inter-Region Connectivity for Direct Network Peerings," Doane et al., 118 pages.

U.S. Appl. No. 13/335,490, filed Dec. 22, 2011, "Interfaces to Manage Service Marketplaces Accessible Via Direct Network Peerings," Miller et al., 118 pages.

U.S. Appl. No. 13/555,360, filed Jul. 23, 2012, "Automated Multi-Party Cloud Connectivity Provisioning," Cullen et al.

* cited by examiner

PORTABLE CONNECTION DIAGNOSTIC DEVICE

CROSS-REFERENCE TO RELATED APPLICATIONS

This application incorporates by reference for all purposes the full disclosure of U.S. patent application Ser. No. 13/306,775, filed on Nov. 29, 2011, entitled "INTERFACES TO MANAGE DIRECT NETWORK PEERINGS."

BACKGROUND

Computing resource service providers and other service providers often grant users access to their services through the use of dedicated network connections. Many users, for example, utilize a data center or colocation environment to connect directly with the computing resource service provider. Despite their many advantages, creating a dedicated connection between the computing resource service provider and a customer may present some risks that are borne by the computing resource service provider and the organizations that utilize them. For example, despite their best efforts to avoid it, the dedicated connection may be installed incorrectly by a data center technician, often times without fault of the technician. In some situations, a cable that is meant to be used to transmit data to or receive data from the computing resource service provider may be installed into the incorrect port, resulting in a connection failure and thus prevent a customer from receiving or transmitting data to the computing resource service provider. Such errors may be difficult to avoid in instances where multiple cables are similar or even visually indistinguishable. Adequately addressing these risks, presents additional costs to the organizations that rely on the dedicated connection and to the computing resource service provider as well as significant delay.

BRIEF DESCRIPTION OF THE DRAWINGS

Various embodiments in accordance with the present disclosure will be described with reference to the drawings, in which.

DETAILED DESCRIPTION

Figure 1:
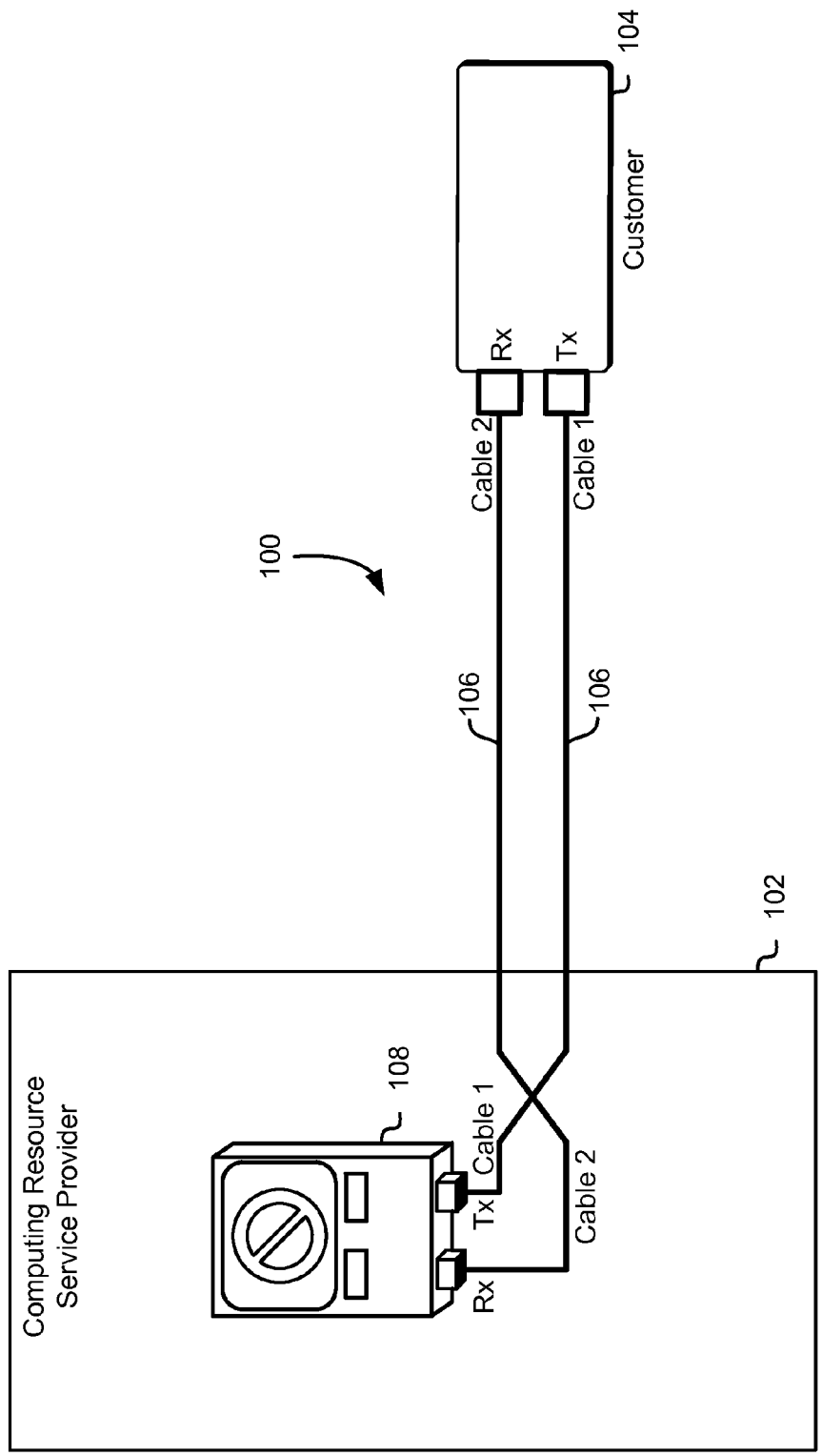
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of a handheld diagnostic device to correctly establish a connection between a customer (e.g., a network operated by the customer) and a computing resource service provider. In an embodiment, an employee of the computing resource service provider (e.g., a data technician) receives a request to install one or more cables that may be used to establish a communications connection between an entity (e.g., an organization) and a computing resource service provider. The entity may be a customer of the computing resource service provider who may operate various services such as data storage services, virtual computing system services and/or database services. For optimal usage of one or more of the services, the computing resource service provider may allow customers to communicate with the computing resource service provider's network using direct connections, i.e. physical communications connections that connect customer computing resources to computing resource service provider computing resources. Example techniques for establishing such connections are described in U.S. patent application Ser. No. 13/306,775, filed on Nov. 29, 2011, titled "Interfaces to Manage Direct Network Peerings," which is incorporated herein by reference in its entirety for all purposes.

Prior to installation of the one or more cables, the employee of the computing resource service provider may have received information regarding the entity for which the connection is being established. For instance, the employee may utilize a device to communicate with the computing resource service provider to obtain information regarding the entity and the task to be performed on site. Additionally, the computing resource service provider may provide additional information that may be pertinent to the installation of the cables.

In various embodiments, a data technician may utilize the device to determine whether the cables have been installed correctly while he or she is on site. The device may be configured to allow a data technician to plug the cables into the device to determine whether the cables were installed correctly using a variety of methods. For instance, in an embodiment, once the data technician has plugged the cables into the device, the device may display the status of the connection and provide information necessary to ensure the correct installation of the cables. The device may also analyze information from different levels of a network stack (such as according to the Open System Interconnection (OSI) mode. For instance, the device may extract information from IP packets (which may be wrapped using a fiber channel or other protocol) or other packages of information and display some or all of the extracted information, or information that is based at least in part on the extracted information. Additionally, the device may display relevant customer information to ensure the data being received from the cables corresponds to the customer that submitted the request.

In various embodiments, the device may comprise a wireless transceiver for the purpose of allowing a data technician to obtain information from the computing resource service provider while on site. For instance, once the data technician has been dispatched to a remote data center to establish a direct connection between a customer and the computing resource service provider, the data technician, prior to installing the cables into the appropriate ports, may use the device to download information regarding the installation directly from the computing resource service provider. Additionally, once the cables have been plugged into the device to test the connection, the data technician may use the device to receive a test data packet from the computing resource service provider to determine whether the data technician is utilizing the correct customer cables. Thus, the data technician may utilize the device to ensure he or she has the information needed to perform the relevant task and to be able to address any issues that may arise while on site.

In an embodiment, the data technician may use the device to test the signal itself to determine that it is adequate for a customer's computing needs. As noted above, the device may be used to display the status of the connection to ensure the cables have been installed correctly. Additionally, the device may display whether a signal exists or whether the signal strength is adequate. This may enable a data technician to field test the cables themselves to determine whether the cables may be faulty or damaged and replace them accordingly. Alternatively, if the cables are not the issue, the data technician may install additional hardware to amplify or attenuate the signal to the point that it may reach adequate levels.

In this manner, a data technician may install the cables correctly and address any issues that may arise during the installation process while on site. In addition, the techniques described herein facilitate additional technical advantages. For example, because, in some embodiments, the device may display relevant information that may allow a data technician to address any issues while on site, a customer relying on the dedicated connection to the computing resource service provider may not need to contact the computing resource service provider at a later time upon discovery of an issue with the connection. This, in turn, may reduce the cost of any downtime, particularly for a customer that relies on the services provided by the computing resource service provider to support its business. Additional uses are also enabled by the various techniques described herein.

FIG. 1 shows an illustrative example of an environment 100 in which various embodiments may be practiced. In the environment 100, a computing resource service provider 102 provides various computing resource services to customers of the computing resource service provider. The computing resource service provider 102 may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource hardware may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 may be an organization that could utilize the various services by establishing a direct connection with the computing resource service provider 102. The customer 104 of the computing resource service provider 102 may utilize various services provided by the computing resource service provider 102. For example, the customer 104 may utilize the services provided by the computing resource service provider 102 through automated processes, such as batch requests made to a service or customer server requests that require access to the service to support a customer operation. As illustrated in FIG. 1, the customer 104 may access the various services provided by the computing resource service provider 102 through the use of cables 106. The cables 106 may be selected from a pair of cables of a communication circuit that each have a separate connector. The cables 106 may be kept in separate housings or wiring bundles. Alternatively, the cables 106 may be part of the same housing but comprise separate connectors. For instance, in the context of a fiber-optic connection, the circuit may be a transmit/receive circuit. The cables 106 may be comprised of optical fiber elements used to transmit light signals over long distances. While cables comprised of optical fiber elements are used extensively throughout the present disclosure for the purpose of illustration, the scope of the present disclosure is not necessarily limited to the types of cables explicitly noted herein. For example, some techniques described herein are applicable to other types of connections, such as connections over copper wire.

The customer 104 may contact the computing resource service provider 102 to request the installation of a direct connection to the computing resource service provider. The computing resource service provider may deploy a data technician to install the cables 106 between a customer 104 router and a computing resource service provider 102 router. The routers may be located in a data center which, in turn, may be located in a remote location. Thus, the installation of the cables 106 may need to be installed correctly to prevent any issues that may arise resulting from a connection problem. Accordingly, a data technician may utilize a diagnostic device 108 to ensure that the cables 106 are installed correctly. For instance, as illustrated in FIG. 1, the data technician may plug the cables 106 directly into the diagnostic device 108 to determine, among other things, whether the technician has obtained the correct transmission and reception cables for the customer 104. In this illustrative example, the technician may have plugged the cables 106 incorrectly into the diagnostic device 108. The diagnostic device 108 may be configured to detect whether the cables 106 have been plugged into the diagnostic device 108 correctly and display the status of the connection. Accordingly, the diagnostic device 108 may include a display that may be configured to display an error message to the data technician. This may allow a data technician to determine the error and take any corrective measures.

The diagnostic device 108 may additionally be configured to determine whether a data technician supporting the computing resource service provider 102 has obtained the cables 106 corresponding to the correct customer 104. As illustrated in FIG. 1, the diagnostic device 108 may be configured to display an error if there is a problem with the connection to the computing resource service provider 102. Thus, if the data technician has plugged into the diagnostic device 108 the cables 106 associated with a different customer 104, the diagnostic device 108 may display an error. As it will be described below, in at least one embodiment, the diagnostic device 108 may be configured to display relevant customer 104 information and the nature of the task. This may include the port number for installing the cables 106 and the customer identification number. Additionally, the diagnostic device 108 may be configured to compare a virtual local area network (VLAN) tag associated with the customer 104 and a VLAN tag obtained from the present connection to determine whether the data technician has obtained the correct customer cables 106 for the connection. If the VLAN tags do not match, the diagnostic device 108 may display an error as illustrated in FIG. 1.

Figure 2:
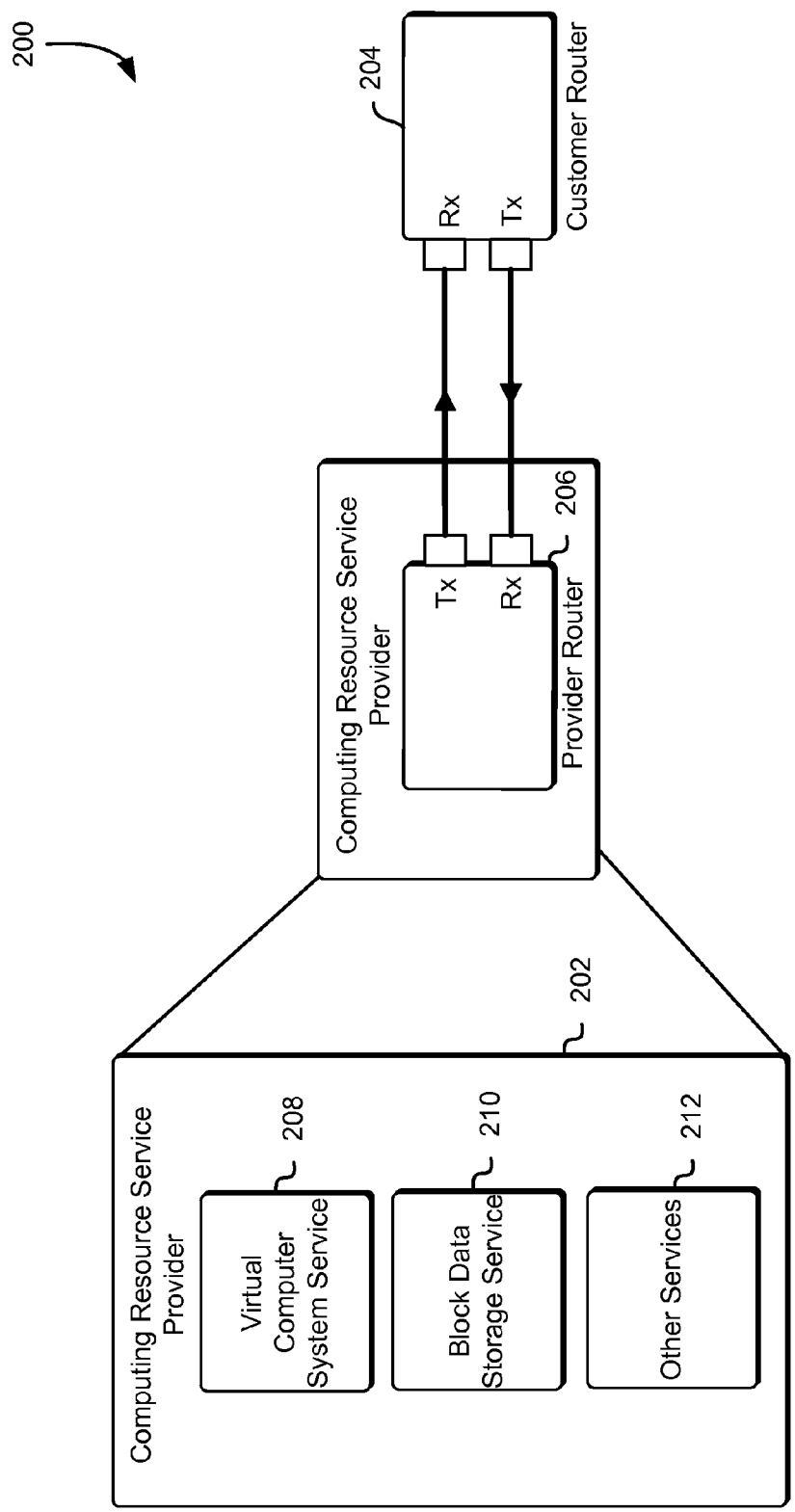
FIG. 2 shows an illustrative example of an environment in which various embodiments can be practiced.

FIG. 2 shows an illustrated example of an environment 200 in which various embodiments of the present disclosure may be practiced. The environment 200 illustrated in FIG. 2 may include components such as those described above in connection with FIG. 1. For example, the environment 200 in FIG. 2 includes a computing resource service provider 202 and a customer. The computing resource service provider 202 and a customer may be configured such as described above in connection with FIG. 1. As illustrated in FIG. 2, the customer may establish a direct connection with the computing resource service provider 202 through the use of one or more routers. In this illustrative example, the direct connection between the customer and the computing resource service provider 202 may be established by installing cables between a customer router 204 and a computing resource service provider router 206. The routers illustrated in FIG. 2 may comprise a variety of ports configured to allow users to transmit data to a recipient or receive data from a source. For instance, a router may comprise a transmission port and a receiving port. Thus, the connection between the customer router 204 and the computing resource service provider router 206 may include a plurality of cables that, when connected to the routers, enable the customer and the computing resource service provider to transmit and receive data.

As noted above, a computing resource service provider 202 may provide various computing resource services to its customers. For instance, in this particular illustrative example, the computing resource service provider 202 provides at least three services. The services provided by the computing resource service provider, in this example, include a virtual computer system service 208, a block data storage service 210, and a plurality of other services 212 that a customer may utilize in support of its business. Although this illustrative example comprises these three services, not all embodiments of the present disclosure will include all such services and additional services may be provided in addition to or as an alternative to services explicitly described herein.

The virtual computer system service 208 may be a collection of computing resources configured to instantiate virtual machine instances onto virtual computing systems on behalf of the customers of the computing resource service provider 202. Customers of the computing resource service provider 202 may interact with the virtual computer systems' service to provision and operate virtual computer systems that are instantiated on physical computing devices hosted and operated by the computing resource service provider 202. The virtual computer systems may be used for various purposes, such as to operate as servers supporting a website. Other applications for the virtual computer systems may be to support database applications, electronic commerce applications, business applications and/or other applications.

The block-level data storage service 210 may comprise a collection of computing resources that collectively operate to store data for a customer. The data stored in the block-level data storage service 210 may be organized into data objects. The data objects may have arbitrary sizes except, perhaps, for certain constraints on size. Thus, the block-level data storage service 210 may store numerous data objects of varying sizes. The block-level data storage service 210 may operate as a key value store that associates data objects with identifiers of the data objects which may be used by the customer to retrieve or perform other operations in connection with the data objects stored by the block-level data storage service 210. Access to the data storage service may be made through appropriately configured application programming interface (API) calls.

The computing resource service provider 202 may additionally maintain one or more other services 212 based on the needs of its customers. For instance, the computing resource service provider 202 may maintain a database service for its customers. A database service may be a collection of computing resources that collectively operate to run one or more databases for one or more customers. Customers of the computing resource service provider 202 may operate and manage a database from the database service by utilizing appropriately configured API calls. This, in turn, may allow a customer to maintain and potentially scale the operations in the database. Other services include, but are not limited to, object-level data storage services, object-level archival data storage services, services that manage other services and/or other services.

As illustrated in FIG. 1, if the cables used to connect the customer router 204 and the computing resource service provider 206 are installed incorrectly, the customer may not have access to the plurality of services provided by the computing resource service provider 202. Thus, a data technician employed by the computing resource service provider 202 or by another entity (e.g., a contractor to the computing resource service provider or a customer) may need to ensure that the cables are installed properly.

Figure 3:
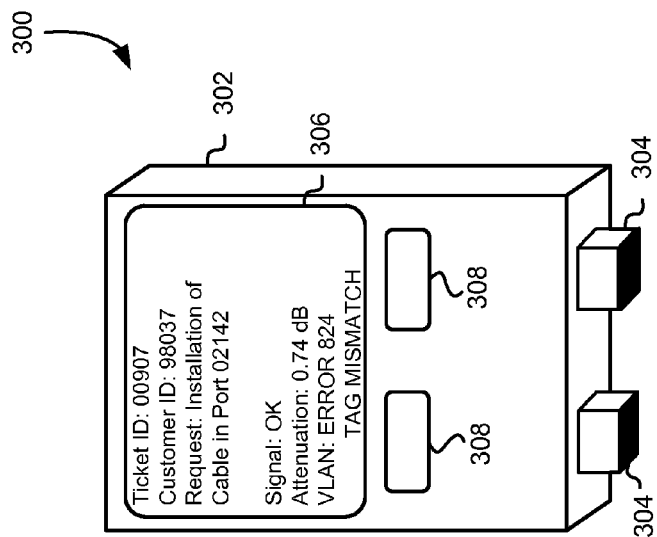
FIG. 3 shows an illustrative example of a device with which various embodiments can be practiced.

As noted above, a data technician may utilize a device to determine whether the cables used to establish a direct connection between a customer and the computing resource service provider have been installed correctly. If the cables are not installed correctly, the device may be configured to display information necessary to address the issue and ensure a proper connection. Accordingly, FIG. 3 shows an illustrative example of an environment 300 that includes a diagnostic device 302 configured to determine whether the cables have been installed correctly, and, if not, display an error in accordance with at least one embodiment. The diagnostic device 302 may include a housing for a variety of components configured to operate together to determine the status of a connection. For instance, the diagnostic device 302 may comprise, within the housing, one or more processors configured to execute a series of instructions stored in memory, such as a random-access memory (RAM) chip or a hard drive. The housing may be constructed using any material but should preferably be comprised of a durable material such as a rigid, durable plastic or light weight metal (e.g., aluminum or thin gauge steel). Preferably, in order to make the diagnostic device 302 portable, the diagnostic device 302 may be constructed such that the diagnostic device 302 may fit in a human hand.

The diagnostic device 302 may additionally comprise a plurality of ports 304 configured to receive one or more cables. For instance, in this illustrative example, a data technician may obtain two cables connected at one end to the customer router and plug the free end of the cables into the diagnostic device 302 through the ports 304 provided. The ports 304 may be configured to removably receive one or more cables. The diagnostic device 302 may be configured to determine whether a signal is being transmitted through the cables and determine its strength and attenuation. Additionally, the ports 304 may be configured such that a signal may only be received or transmitted in one direction. For instance, as illustrated in FIG. 3, the diagnostic device 302 may comprise two ports 304. One port may be configured to receive a data signal from the customer while the other port may be configured to transmit a data signal from the diagnostic device 302 to the customer. Thus, if the data technician plugs the customer cables incorrectly into the diagnostic device 302, the diagnostic device 302 may not receive a signal from the customer and may be unable to transmit a signal to the customer, which may result in an error. The ports 304 may be configured to accept different types of cables, with different form factors to accommodate a variety of cable types. The diagnostic device 302 may also be configured to include additional ports 304 to accommodate different types cables, which may comprise different connectors. Additionally, the diagnostic device 302 may comprise and/or may be provided with a kit that includes a plurality of connection adapters which may be inserted into the ports 304 in order to accept different types of form factors.

The diagnostic device 302 may include a display unit 306 configured to provide a data technician with information necessary to connect the cables correctly. For example, in an embodiment, the display unit 306 may be configured to display information that distinguishes the cables plugged into the diagnostic device 302. The display unit 306 may be engaged to the housing such that the display unit 306 may be visible from outside the housing. The display unit 306 may be held in place through underlying structural members, such as a washer or other structural support.

In an embodiment, the display unit 306 may be configured to indicate which cable has been plugged into a port 304. For instance, if the cable used to transmit a fiber-optic signal is plugged into the device, the display unit 306 may include an indicator above the port that may indicate that the port 304 has received the transmission cable. Alternatively, the display unit 306 may indicate that a cable used to receive signals from a computing resource service provider or, in this instance, the device, has been plugged into the port. While a display unit 306 is used extensively throughout the present disclosure for the purpose of illustrating how the diagnostic device 302 may be configured to display cable connections to the ports 304, the scope of the present disclosure is not necessarily limited to this type of indication of connectivity. For instance, the diagnostic device 302 may include one or more light-emitting diode (LED) indicators above each port that may be configured to illuminate when a cable is plugged into the port. The LED indicators may be configured to illuminate using a different color light depending on the type of cable (e.g., transmission or receiving) plugged into the port 304. In this fashion, a data technician may use the diagnostic device 302 to distinguish the cables plugged into the diagnostic device 302.

In this illustrative example, the diagnostic device 302 may have detected an error in the connection and may thus be configured to alert the data technician through the display unit 306. As will be illustrated below in connection with FIG. 5, the diagnostic device 302 may comprise a transceiver which may be configured to communicate with a remote system such as a computing resource service provider system through a wireless connection to obtain customer and ticket information relating to the present task the data technician is to perform. The diagnostic device 302, upon receiving this information from the computing resource service provider, may be configured to provide the information through the use of the display unit 306. In this instance, the diagnostic device 302 may display the ticket identification number, the customer identification number, and information regarding the customer request.

Once the cables have been plugged into the ports 304, the diagnostic device 302 may be additionally configured to determine whether the data technician has obtained the correct cables and plugged them into the ports 304 accordingly. In this illustrative example, the data technician may have obtained a set of cables associated with a different customer or a different customer router and plugged them into the ports 304 resulting in an error. In order to determine whether an error exists, the diagnostic device 302 may be configured to obtain the expected VLAN tag for the customer through the computing resource service provider. This VLAN tag may be stored in RAM within the diagnostic device 302 for later comparison. Subsequently, the diagnostic device 302 may be configured to transmit a data packet to the customer computer systems through the customer router in order to elicit a response that may contain the VLAN tag associated with the customer. Once the diagnostic device 302 receives this VLAN tag, the diagnostic device 302 may be configured to recall the VLAN tag from memory and compare the expected VLAN tag and the received VLAN tag to determine whether the tags match. If the tags do not match, then the diagnostic device 302 may be configured to display an error message on the display unit 306. This error may notify the data technician that he or she has obtained a set of cables associated with a different customer and allow the data technician to take corrective actions to address the problem.

While, in some embodiments, a data technician may obtain the expected VLAN tag through a wireless connection to the computing resource service provider, the present disclosure is not limited to such a method. For instance, the diagnostic device 302 may be configured to allow a data technician to manually input an expected VLAN tag associated with a customer through the use of one or more user interface devices 308. Alternatively, the diagnostic device 302 may be configured to include one or more Universal Serial Bus (USB) or other ports which may provide direct electrical connection to a device (e.g., another computer or a USB storage device) that provides appropriate data. A data technician may thus insert a USB data storage device comprising customer information, including expected VLAN tags for each customer, into a USB port on the diagnostic device 302. In this manner, a data technician may obviate the need to contact a network operator to reconfigure a customer connection should the VLAN tags not match.

If the customer has specified that the data technician is not authorized to view customer data, the diagnostic device 302 may be configured to omit certain customer information. For instance, as illustrated in FIG. 3, the VLAN tag may not be displayed. Rather, the display unit 306 may be configured to only display an error message associated with the VLAN tags. In this case, the diagnostic device 302, having been configured to compare the expected and actual VLAN tags, may have determined that the tags do not match. Accordingly, the device, through executable instructions, may interact with the display unit 306 to display a corresponding error message.

While an error associated with a VLAN tag mismatch is used extensively throughout the present disclosure for the purpose of illustration, the scope of the present disclosure is not necessarily limited to this type of error. For instance, the diagnostic device 302 may be configured to determine whether it has received a signal from the customer and the attenuation (e.g., loss of intensity of a signal). The diagnostic device 302 may be configured to display an error message through the use of the display unit 306 if the cables are plugged into the ports 304 incorrectly. As noted above, the ports 304 may configured such that one port may be used only for transmissions and the other port may be used for receiving a signal. Thus, if the cables are installed incorrectly into the diagnostic device 302, the diagnostic device 302 may not receive a signal and display an error using the display unit 306. Alternatively, if the cables are installed correctly but there is significant attenuation, the diagnostic device 302 may be configured to display the attenuation level and an associated error using the display unit 306. It should be noted that, while signal characteristics and VLAN tags are used throughout for the purpose of illustration of particular embodiments, the diagnostic device 302 may be configured to obtain other information to determine whether a data technician has installed the cables correctly. For instance, the diagnostic device 302 may be configured to distill additional data from a data packet and display one or more fields related to the data packet such as Internet Protocol (IP) addresses (e.g., IPv4 or IPv6 addresses). This may include extracting the data packet from the protocol used to transmit the data packet (e.g., fiber channel protocol). Additionally, a data technician or other user of the diagnostic device 302 may customize additional fields that may be displayed on the display unit 306, such as the signal strength of the signal received through the cables, through a properly configured API call to the diagnostic device 302. Alternatively, the diagnostic device 302 may be configured to include one or more security protocols that may prevent certain information from being displayed, such as a packet payload, customer VLAN tag, IP address or other information that may be identified as sensitive information.

The diagnostic device 302 may include a plurality of user interface devices 308 for interaction with the diagnostic device 302. For instance, as illustrated in FIG. 3, the diagnostic device 302 may comprise a plurality of buttons 308 that the data technician may utilize to interact with the diagnostic device 302. In some circumstances, the diagnostic device 302 may be configured to display information that does not completely fit on the display unit 306. Accordingly, the buttons 308 may be configured to allow a data technician to scroll the text on the display unit 306 up or down such that the data technician may be able to obtain all relevant information regarding the current task. Alternatively, the buttons 308 may be configured to toggle between different customers or tickets depending on the number of tasks the data technician has been assigned over a given time period. While these examples of user interface devices 308 for interaction with the diagnostic device 302 are used for the purpose of illustration, the scope of the present disclosure is not necessarily limited to the examples explicitly noted herein.

Figure 4:
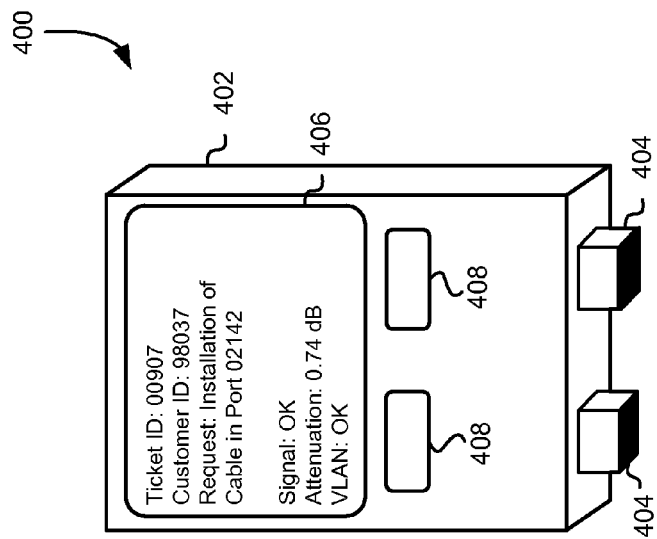
FIG. 4 shows an illustrative example of a device with which various embodiments can be practiced.

If the device does not detect an error, the device may be configured to inform the data technician that no errors were detected and that he or she may complete the installation of the direct connection between the computing resource service provider and the customer. Accordingly, FIG. 4 is an illustrative example of a diagnostic device 402 configured to display validation information if the device does not detect an error in the connection. As illustrated in FIG. 3, the diagnostic device 402 may comprise a housing which, in turn, may comprise one or more processors and computer-readable media such as RAM chips or a hard drive. Additionally, the diagnostic device 402 may comprise a plurality of ports 404 for connecting the cables to the diagnostic device 402, a display 406 for displaying relevant information regarding the installation of the cables to the data technician, and a plurality of user interface devices 408 for the data technician to interact with the diagnostic device 402.

If the data technician installs the cables correctly into the diagnostic device 402, the diagnostic device 402 may be configured to detect a signal from the customer transmission cable and obtain certain information from the signal itself. For instance, the diagnostic device 402 may be configured to determine the strength of the signal being transmitted to the diagnostic device 402. Subsequently, the diagnostic device 402 may be configured to determine the attenuation (e.g., loss of intensity) of the signal. The diagnostic device 402 may be configured to accept certain levels of attenuation and thus not produce an error should attenuation levels be within an acceptable range. Additionally, an acceptable value for the signal strength may be within a range specified by the computing resource service provider.

As noted above, the diagnostic device 402 may be configured to compare the expected VLAN tag for the customer and an actual VLAN tag received through the cables connected at one end to the diagnostic device 402 and at the other end to a customer. The diagnostic device 402 may be configured to transmit a data packet to the customer that may include instructions configured to elicit a response from the recipient of the data packet. For instance, the recipient may receive the data packet and respond by sending a test data packet that may comprise the VLAN tag of the recipient. The diagnostic device 402 may receive the test data packet and extract the VLAN tag from the data packet. Once this occurs, the diagnostic device 402 may be configured to compare the actual VLAN tag to the expected customer VLAN tag and determine whether the tags match.

If the diagnostic device 402 does not detect any errors, the diagnostic device 402 may be configured to report the results of its examination of the connection on the display 406. For instance, as illustrated in FIG. 4, if the diagnostic device 402 did not detect any errors, the diagnostic device 402 may still be configured to display the tests it performed and the corresponding results. In the illustrative example, the diagnostic device 402 has displayed that the signal and VLAN tags are "OK." Additionally, as illustrated in FIG. 4, the diagnostic device 402 may display that it detected a signal and the corresponding attenuation. Again, the diagnostic device 402 may be configured to display additional information, such as the signal strength of the signal received through the cables. While the use of VLAN tags are used extensively throughout the present disclosure for the purpose of illustration, the scope of the present disclosure is not limited to the display of VLAN tag information or status. For instance, the diagnostic device 402 may be configured to display that the signal is "OK" but not display any information regarding a customer VLAN tag if such a VLAN tag was not requested or expected. Alternatively, the diagnostic device 402 may be configured to display other information or status, such as an IP address for the customer router or whether the correct IP address has been assigned to the customer router.

As noted above in connection with FIG. 3, if the customer has specified that the data technician is not authorized to view customer data, the diagnostic device 402 may be configured to omit certain customer information. In this illustrative example, the diagnostic device 402 may be configured to compare the expected VLAN tag with the actual VLAN tag in the customer data packet. If there is a match, and the data technician is not authorized to view the VLAN tags, the device may be configured to display a simple message indicating that there is a match. For instance, in the illustrative example, the diagnostic device 402 has been configured to display that the VLAN tag is "OK" rather than displaying the expected and actual customer VLAN tags.

Once the data technician has been informed that there are no issues with the present connection, the data technician may utilize the user-interface devices 408 on the diagnostic device 402 to report his or her status to the computing resource service provider, the customer, and/or select a new request. For instance, in an embodiment, the data technician may use the user-interface devices 408 to deliver a status report wirelessly to a plurality of recipients, including the computing resource service provider and the customer. For example, the data technician may interact with the diagnostic device 402 to deliver an electronic mail message to the computing resource service provider and the customer to confirm the status of the connection or the necessary steps to be taken by the data technician. The data technician may subsequently disconnect the cables from the ports 404 located on the diagnostic device 402 and accordingly connect the cables to the computing resource service provider router.

Figure 5:
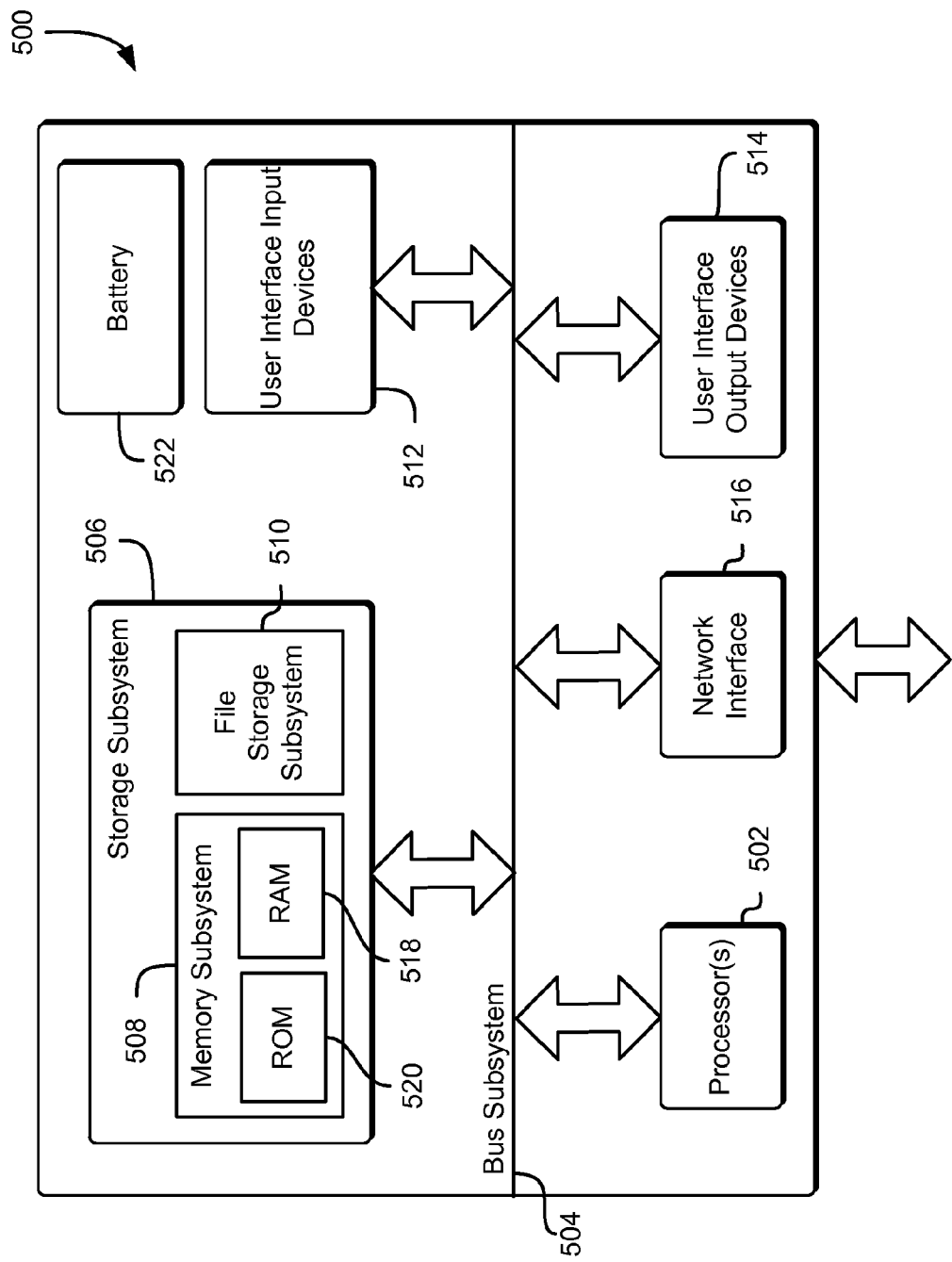
FIG. 5 shows an illustrative example of an example device system that may be used in accordance with at least one embodiment.

FIG. 5 is an illustrative, simplified block diagram of an example device system 500 that may be used to practice at least one embodiment of the present disclosure. In various embodiments, the device system 500 may be used to implement any of the systems illustrated herein and described above. For example, the device system 500 may be used to receive data technician requests for additional customer and ticket information, submit any requests to a computing resource service provider, receive any responses or communications from a computing resource service provider, detect and receive one or more optical signals, transmit one or more optical signals, process one or more signals, display diagnostic test results on a display and/or perform other activities. As shown in FIG. 5, the device system 500 may include one or more processors 502 that may be configured to communicate with and are operatively coupled to a number of peripheral subsystems via a bus subsystem 504. These peripheral subsystems may include a storage subsystem 506, comprising a memory subsystem 508 and a file storage subsystem 510, one or more user interface input devices 512, one or more user interface output devices 514, and a network interface subsystem 516.

The bus subsystem 504 may provide a mechanism for enabling the various components and subsystems of device system 500 to communicate with each other as intended. Although the bus subsystem 504 is shown schematically as a single bus, alternative embodiments of the bus subsystem may utilize multiple busses.

The network interface subsystem 516 may provide an interface to other device systems and networks. The network interface subsystem 516 may serve as an interface for receiving data from and transmitting data to other systems from the device system 500. For example, the network interface subsystem 516 may enable a data technician to connect the device to a wireless network such that the data technician may be able to transmit and receive data while in a remote location, such as a customer data center. For example, as will be illustrated in FIG. 6, the data technician may utilize the device to transmit a request for additional customer and ticket information to a computing resource service provider through a wireless access point. Additionally, the data technician may use the device to receive transmissions from the computing resource service provider through a similar wireless access point. The network interface subsystem 516 may also facilitate the receipt and/or transmission of data on other networks, such as a customer or data center network. The network interface subsystem 516 may additionally be configured to receive and transmit fiber-optic signals and convert these signals into an electrical signal which may be read by the handheld fiber-optic diagnostic device.

The user interface input devices 512 may include one or buttons as illustrated in FIGS. 3 and 4, a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the device system 500.

User interface output devices 514 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the device system 500. The output device(s) 514 may be used, for example, to present user interfaces to facilitate user interaction with applications performing processes descried herein and variations therein, when such interaction may be appropriate.

The storage subsystem 506 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 506. These application modules or instructions may be executed by the one or more processors 502. The storage subsystem 506 may additionally provide a repository for storing data used in accordance with the present disclosure. The storage subsystem 506 may comprise a memory subsystem 508 and a file/disk storage subsystem 510.

The memory subsystem 508 may include a number of memories including a main random access memory (RAM) 518 for storage of instructions and data during program execution and a read only memory (ROM) 520 in which fixed instructions may be stored. The file storage subsystem 510 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The device system 500 may include one or more batteries 522. The batteries 522 may be used to provide a power supply for the device system 500 and all of the subsystems included therein. The batteries 522 may be comprised of one or more electrochemical cells which may convert chemical energy into electrical energy. The batteries 522 may be disposable (e.g., alkaline batteries) or rechargeable (e.g., lithium-ion, nickel-cadmium, nickel-metal hydride, or any other suitable chemical composition that may enable reusability of the battery) and may fit integrally into the device.

The device system 500 may be of various types including a portable computer device, tablet computer, a workstation, or any other data processing system that may provide portability for a data technician or other user of the device. Additionally, the device system 500 may include another device that may be connected to the device system 500 through one or more ports (e.g., USB, a headphone jack, Lightning connector, etc.). The device that may be connected to the device system 500 may include a plurality of ports configured to accept fiber-optic connectors. Accordingly, this device may be configured to convert optical signals to electrical signals that may be transmitted through the port connecting the device to the device system 500 for processing. Due to the ever-changing nature of computers and networks, the description of the device system 500 depicted in FIG. 5 is intended only as a specific example for purposes of illustrating the preferred embodiment of the device. Many other configurations having more or fewer components than the system depicted in FIG. 5 are possible.

Figure 6:
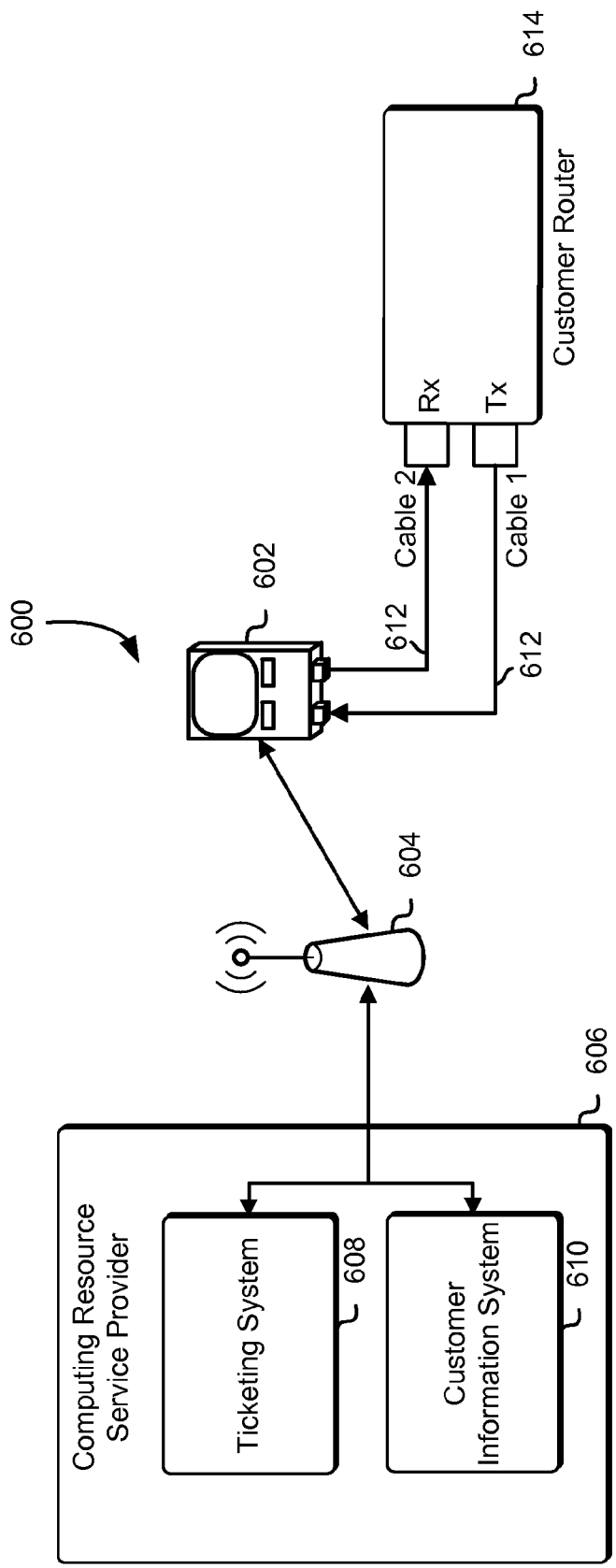
FIG. 6 shows an illustrative example of an environment in which various embodiments can be practiced.

As noted above, a data technician may obtain information regarding a customer request from the computing resource service provider. Accordingly, FIG. 6 is an illustrative example of an environment 600 for obtaining information regarding a customer request wirelessly in accordance with at least one embodiment. In the environment 600, a data technician may be located in a data center in a remote location with a device 602 as described and illustrated in FIGS. 3 and 4. Additionally, since data centers may comprise a variety of cramped spaces, it may not be feasible to use a wired device to communicate with the computing resource service provider 606. Thus, as noted above, the device 602 may comprise a wireless transceiver configured for sending and receiving data wirelessly. The wireless transceiver may utilize one or more wireless communications protocols, such as the Institute of Electrical and Electronics Engineers (IEEE) 802.11 protocol or any of its variants (e.g., 802.11a, 802.11n, etc.), to communicate with other devices over a wireless network. Additionally, the wireless transceiver may be configured to send and receive data using one or more encryption protocols to enhance data security.

When a data technician is located at a data center, the data technician may need to use the device 602 to obtain information necessary to perform a task. For example, the data technician may use the device 602 to obtain more detailed information regarding the task to be performed at the data center for the customer. Accordingly, the data technician may use the device 602 to submit a request, such as through appropriately configured API calls, to the computing resource service provider 606 for information regarding the task. Additionally, in some colocations, the data technician may require additional security credentials in order to access cage. Thus, the data technician may further use the device 602 to submit a request to the computing resource service provider 606 for these security credentials. The device 602 may be configured to transmit the request wirelessly through a wireless access point 604 for delivery to the computing resource service provider 606. The wireless access point 604 may be configured to allow a wireless device, such as the device 602, to connect to the computing resource service provider 606. As noted above, the device 602 may use a wireless communications protocol to access the wireless access point 604 and transmit the request to the computing resource service provider 606. The request may be comprised of one or more data packets that may comprise an Internet Protocol (IP) address of the sender, namely the device 602, and an IP address for the recipient, namely the computing resource service provider 606. The data packet may additionally comprise an identification number for the customer and for the request (e.g., ticket) itself. In this fashion, a data technician may transmit the request wirelessly to the computing resource service provider 606 while at a remote location.

Once the computing resource service provider 606 receives the data packet from the data technician, one or more systems within the computing resource service provider 606 may extract information from the data packet. For example, if the data packet includes a ticket and customer identification number, the computing resource service provider 606 may take this information and transmit it to a ticketing system 608 and a customer information database 610 to obtain information related to the request. The ticketing system 608 may be configured to receive a ticket identification number and find information associated with that number. For instance, information that may be associated with the ticket identification number may include a detailed description of the task, an inventory of equipment necessary to perform the task and other relevant technical information that may be useful to the data technician.

If the data packet includes a customer identification number, the computing resource service provider 606 may transmit this number to a customer information system 610. The customer information system may be configured to receive the customer identification number from the computing resource service provider 606 and locate the corresponding information for the customer. The information associated with the customer may include past customer requests, router port identification numbers used at a data center that may be associated with the customer and any other information that may be unique to the customer. Additionally, the information associated with the customer may include any applicable security protocols for handling customer data. For instance, the customer may have specified that no unauthorized persons are permitted to view any customer data, including any IP addresses or tags. Unauthorized persons may include the data technician.

Once the computing resource service provider 606 has obtained the relevant customer and ticket information from the ticketing system 608 and the customer information system 610, the computing resource service provider 606 may transmit a data packet with information necessary to fulfill the request originally submitted by the data technician. The data packet sent from the computing resource service provider 606 may be transmitted to the data technician wirelessly through the wireless access point 604 and on to the device 602. The device 602 may obtain the data packet and distill the ticket and customer information to determine what information to display. For instance, if the customer has specified that the data technician is not authorized to view customer data, the device 602 may be configured to obtain this information from the data packet and not display any sensitive customer information, such as the customer VLAN tag or any IP addresses associated with the customer connection. The device 602 may display any other information that may be relevant for the technician to perform the task.

With the requisite information displayed on the device 602, the data technician may now be able to perform the task as specified in the ticket. In this instance, the data technician may take cables 612 connected at one end to the customer router 614 and plug the other end into the device 602. Once the cables 612 are plugged into the device 602, the data technician may check the connection to determine whether he or she has obtained the correct customer cables 612 or that the cables 612 have been plugged into the device 602 correctly. The device 602, as illustrated in FIGS. 3 and 4, may accordingly display the results of the diagnostic test. If the device 602 has provided information consistent with an error in the connection, the data technician may perform any action necessary to resolve the issue. For instance, the data technician may obtain a new set of cables if he or she has plugged in the incorrect customer cables 612. Alternatively, the data technician may switch the cables if the device 602 has detected that no signal is coming through the cables 612. After the data technician has addressed the issue, he or she may plug the cables 612 back into the device 602 for another diagnostic test. While the use of diagnostic tests are used extensively throughout the present disclosure for the purpose of illustration, the present disclosure is not limited to such tests. For example, the device 602 may be configured to perform network bandwidth tests to determine the download or upload speed of the network.

If the data technician has resolved any issues with the data connection or the device 602 did not produce an error, the data technician may install the cables 612 into the computing resource service provider router. The data technician may use the device 602 to send a data packet to the computing resource service provider 606 informing it that the task has been completed. Additionally, the data technician may use the device 602 to deliver an electronic mail message to the computing resource service provider 606 and the customer informing them that the task has been completed and any additional diagnostic information that may be required.

Figure 7:
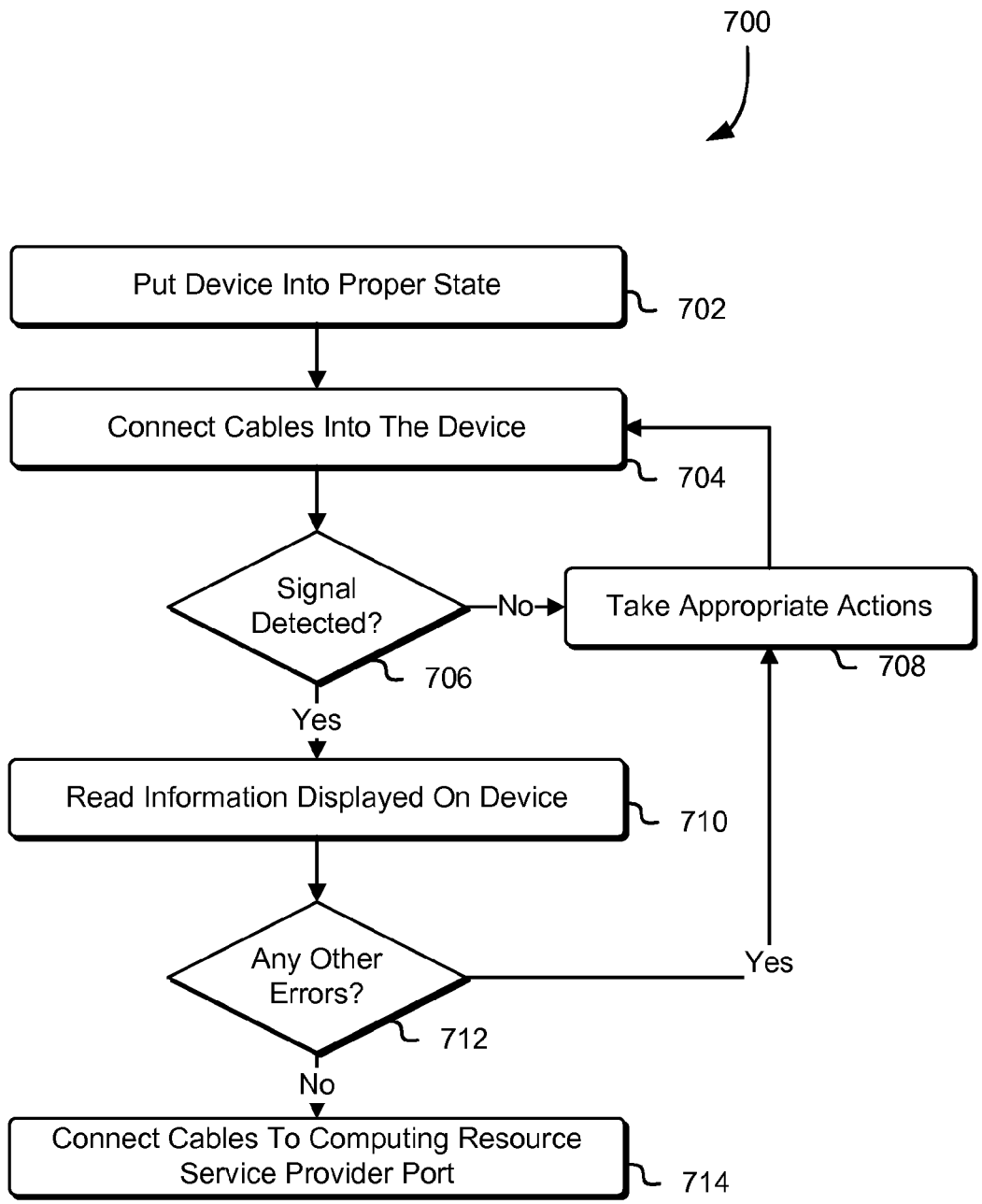
FIG. 7 shows an illustrative example of a process for determining the proper installation of a cable in accordance with at least one embodiment.

As noted above, a data technician may utilize the device to test and diagnose any issues with a network connection between a customer and the computing resource service provider. Accordingly, FIG. 7 is an illustrative example of a process for determining the proper installation of one or more cables in accordance with at least one embodiment. A data technician, upon arriving at a data center, may be tasked to perform one or more operations according to a customer request. The data technician may utilize a device, such as the one illustrated in FIGS. 3 and 4, to perform one or more tests related to the task. Accordingly, the process 700 includes having the data technician put the device into a proper state 702. For instance, if the data technician turns on the device, the device may be configured to monitor for a signal and display an error until it detects a signal. Alternatively, the device may not be ready to evaluate a connection until the data technician has submitted, through appropriately configured API calls, a request to examine a connection. In this instance, prior to submitting the request, a data technician may submit a request to the computing resource service for more information regarding the customer and the task to be performed on site. Subsequently, the computing resource service provider may refer to a ticketing system and a customer information system to obtain the requested information and transmit a data packet to the device. The data packet may comprise a detailed description of the task assigned to the data technician, relevant customer information and, in some embodiments, a VLAN tag associated with a customer data transmission. The VLAN tag may be used to determine whether the data technician has tested the correct customer cables, as will be described below.

As noted above, the customer may have implemented one or more security protocols to prevent unauthorized access to customer data. Accordingly, the customer may specify that no data technicians are authorized to obtain customer information related to data transmissions, such as customer IP addresses or VLAN tags. Based on the customer security protocols, the computing resource service provider may configure the data packet such that it contains executable instructions for the device that may prevent the device from displaying sensitive customer data and information. Consequently, the device may be configured to display customer and ticket information contained in the data packet without any sensitive data, thus providing the data technician with information necessary to perform the task.

Once the device has been put into the proper state, the data technician may select a set of cables available at the data center and connect 704 the cables into the device. For instance, a plurality of cables may be connected to a customer router at one end while the other end of each cable is freely available. Using the device illustrated in FIGS. 3 and 4, the data technician may take two cables and plug the free end of each cable into the available ports on the device. Alternatively, the data technician may take one cable that he or she suspects may be the cable used to transmit a signal from the customer router and connect this cable into the device. Subsequently, the data technician may use a user-interface device (e.g., a button) on the device to instruct the device to perform one or more diagnostic tests. The one or more tests may serve to determine whether the data technician has obtained the correct cable(s) and whether the data technician has plugged them into the device correctly (e.g., the transmission and reception cables are inserted into the correct ports).

As part of the diagnostic tests the device may be configured to perform, the device may be configured to detect 706 a signal being transmitted from the customer router, through the transmission cable and into the device. In numerous instances, the device may not detect a signal coming from the cables connected at one end to the customer router. For example, as noted above, if the ports on the device are configured to be unidirectional (e.g., one port is configured to transmit data while the other is configured to receive data), the cables may need to be plugged into the device correctly. Thus, if the cables are plugged into the device incorrectly, the device may not detect a signal. In another example, the customer router may not be transmitting data and thus the cables may not be carrying a signal to the device. If the device does not detect a signal, the device may be configured to display an error message.

Additionally, the device may be configured to detect whether the signal strength of the detected signal is within the dynamic range of a receiver, namely the computing resource service provider router. For instance, if the signal strength is too low, the computing resource service provider may not be able to detect and decode the data being transmitted by the customer. Alternatively, if the signal strength is too high, the signal may damage the computing resource service provider router. Accordingly, if the signal strength is outside of the dynamic range for the computing resource service provider router, the device may be configured to display an informative error message such that the data technician may read the error message and determine whether the signal strength is too high or too low.

The data technician, upon reading the error message displayed on the device, may proceed to take appropriate actions 708. For example, if the cables are plugged into the device incorrectly, as illustrated above, the data technician may unplug the cables from the device and switch the cables accordingly. At this point, the data technician may reset the device and instruct the device to perform another diagnostic test. Depending on the error message received, the data technician may perform additional tasks to ensure the device receives a signal and, additionally, ensure the signal strength is within the dynamic range of the computing resource service provider router. For instance, if the signal is outside of the desired dynamic range of the computing resource service provider router, the data technician may amplify or attenuate the signal to bring the signal within the dynamic range of the computing resource service provider router. In this fashion, the data technician may be able to ensure the customer signal is received properly by the device and, subsequently, the computing resource service provider router. While the methods noted above for addressing any issues with a signal are used extensively throughout the present disclosure for the purpose of illustration, the scope of the present disclosure is not necessarily limited to the processes explicitly noted herein.

Once the data technician has confirmed that the signal is within the dynamic range and thus may enable communications between the customer router and the computing resource service provider router, the data technician may read 710 additional information displayed on the device. For instance, as illustrated in FIGS. 3 and 4, the device may be configured to display information related to a customer VLAN tag. Additionally, the device may be configured to display additional information, such as a customer IP address, the IP address of the computing resource service provider router and connection bandwidth. If the device is unable to obtain information related to the connection that the device is configured to display, then the device may display an error message related to the information. For instance, as will be described below in connection to FIG. 9, the device may be configured such that if the expected customer VLAN tag does not match the actual customer VLAN tag received during the diagnostic testing, the device may display an error message.

Accordingly, the data technician may read the information on the device to determine 712 if there are any other errors that the data technician may need to address. If any other errors exist, the data technician may proceed to take 708 any appropriate actions to address these errors. For instance, as noted above, one possible error may involve a VLAN tag mismatch. If a VLAN tag mismatch is present, the data technician may disconnect the cables from the device and select a different set of cables that may be connected to the customer router. Once the data technician has taken the appropriate actions to address any errors, the data technician connect 704 a new set of cables to the device and use the device to conduct a new series of diagnostic tests.

Once the data technician has used the device to determine that the cables connected to the device are carrying an adequate signal and no other errors are present, the data technician may disconnect the cables from the device and connect 714 the cables into the corresponding computing resource service provider ports. At this point, the data technician may use the device to deliver an electronic mail message to the computing resource service provider and the customer to inform them that the task has been completed. Additionally, the data technician may instruct both parties to test the connection to verify it has been configured correctly.

Figure 8:
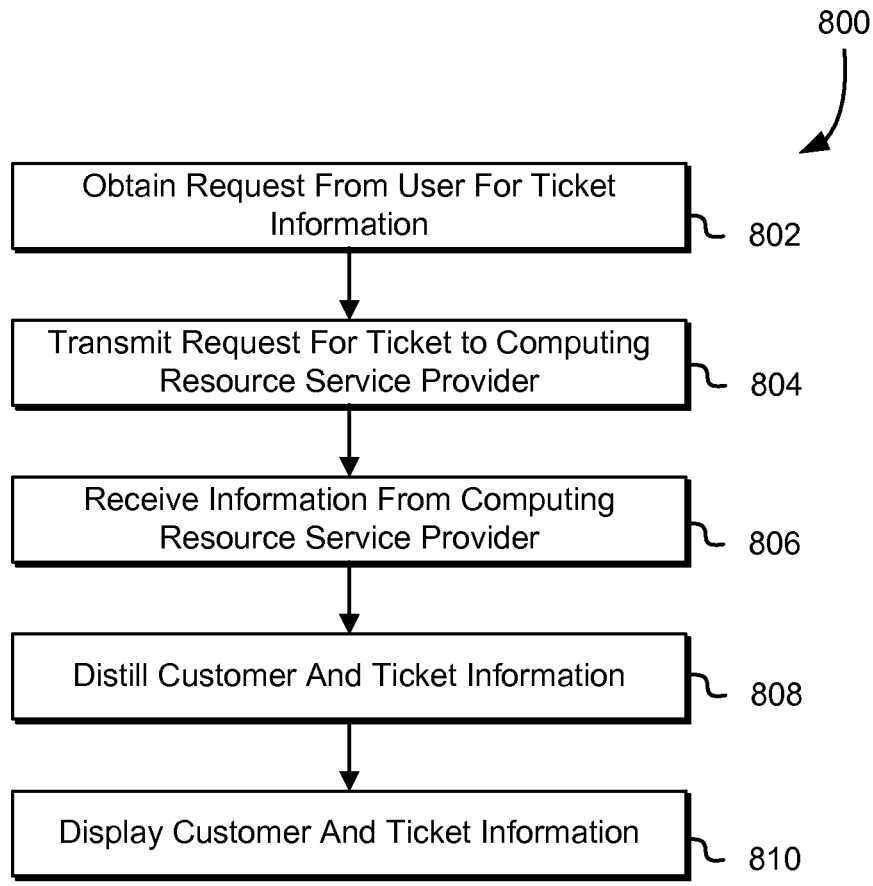
FIG. 8 shows an illustrative example of a process for obtaining and displaying information in accordance with at least one embodiment.

As noted above, a data technician may use the device to contact the computing resource service provider to obtain information regarding the task. Accordingly, FIG. 8 is an illustrative example of a process for obtaining and displaying customer and ticket information in accordance with at least one embodiment. Once the data technician has arrived at a data center to create a connection between a customer router and a computing resource service provider, the data technician may use the device to request more information regarding the task. Accordingly, the process 800 includes obtaining 802 a request from a user (e.g., the data technician) for customer and ticket information. The data technician may utilize user-interface device (e.g., one or more buttons on the device) to submit the request through appropriately configured application programming interface (API) calls.

Once the device has received a request for customer and ticket information from the data technician, the device may be configured to transmit 804 the request to the computing resource service provider. As illustrated in FIG. 6, the device may include a wireless transceiver for sending and receiving wireless transmissions. Accordingly, the device may be configured to prepare a data packet that includes the request made by the data technician. Once the computing resource service provider receives the request, the computing resource service provider may obtain any relevant customer and ticket information that may be helpful to the data technician at the data center, including the expected VLAN tag associated with the customer for verification. Additionally, the computing resource service provider may determine whether the customer has any security protocols in place that may require certain omissions of information. For instance, as noted above, if the data technician is not authorized to view customer data, the computing resource service provider may include executable instructions in the data packet to be sent to the device that may prevent such disclosure of data.

After the computing resource service provider has prepared a data package that includes the requested information and any executable instructions that may be related to customer security, the computing resource service provider may transmit the data package to the device. Accordingly, the process 800 includes receiving 806 the data packet containing the requisite information from the computing resource service provider. As noted above, the device may include a wireless transceiver which may be used to transmit and receive wireless transmissions. Thus, the device may obtain the data packet wirelessly while the data technician is on site at the data center.

Once the device has obtained a data packet from the computing resource service provider, the device may distill 808 the customer and ticket information from the data packet. The device may be configured to display certain customer and ticket information based on a pre-determined set of instructions. For instance, if the device is configured to display ticket information in one hundred and forty characters or less, the device may include a set of executable instructions that enable the device to distill the ticket information from the data packet and truncate or abbreviate certain words or numbers within the ticket information to satisfy the character limit. Additionally, if the data packet includes executable instructions to store customer information in memory (e.g., RAM) but not display the information, the device may perform certain actions in conformity with the executable instructions.

As the device distills the information from the data packet obtained from the computing resource service provider, the device may be configured to display 810 the customer and service ticket information. As illustrated in FIGS. 3 and 4, the device may comprise a display which may enable a data technician to review any information relevant to the task at hand. Based on the distillation process, the device may be configured to display only a subset of the customer and ticket information received. For instance, if the data technician is not authorized to view customer data, the device may be configured to not display the customer IP address or expected VLAN tag. As illustrated in FIGS. 3 and 4, the device, in this instance, may be configured to display whether the VLAN tags match or not without displaying the full VLAN tag. Additionally, the device may be configured to display certain information on individual pages. For instance, as illustrated in FIGS. 3 and 4, the device may be configured to display the customer and ticket identification numbers on one page. However, detailed ticket information may be displayed on a separate page, which the data technician may access submitting an appropriately configured API call. In this fashion, the data technician may be able to review relevant customer and ticket information remotely.

Figure 9:
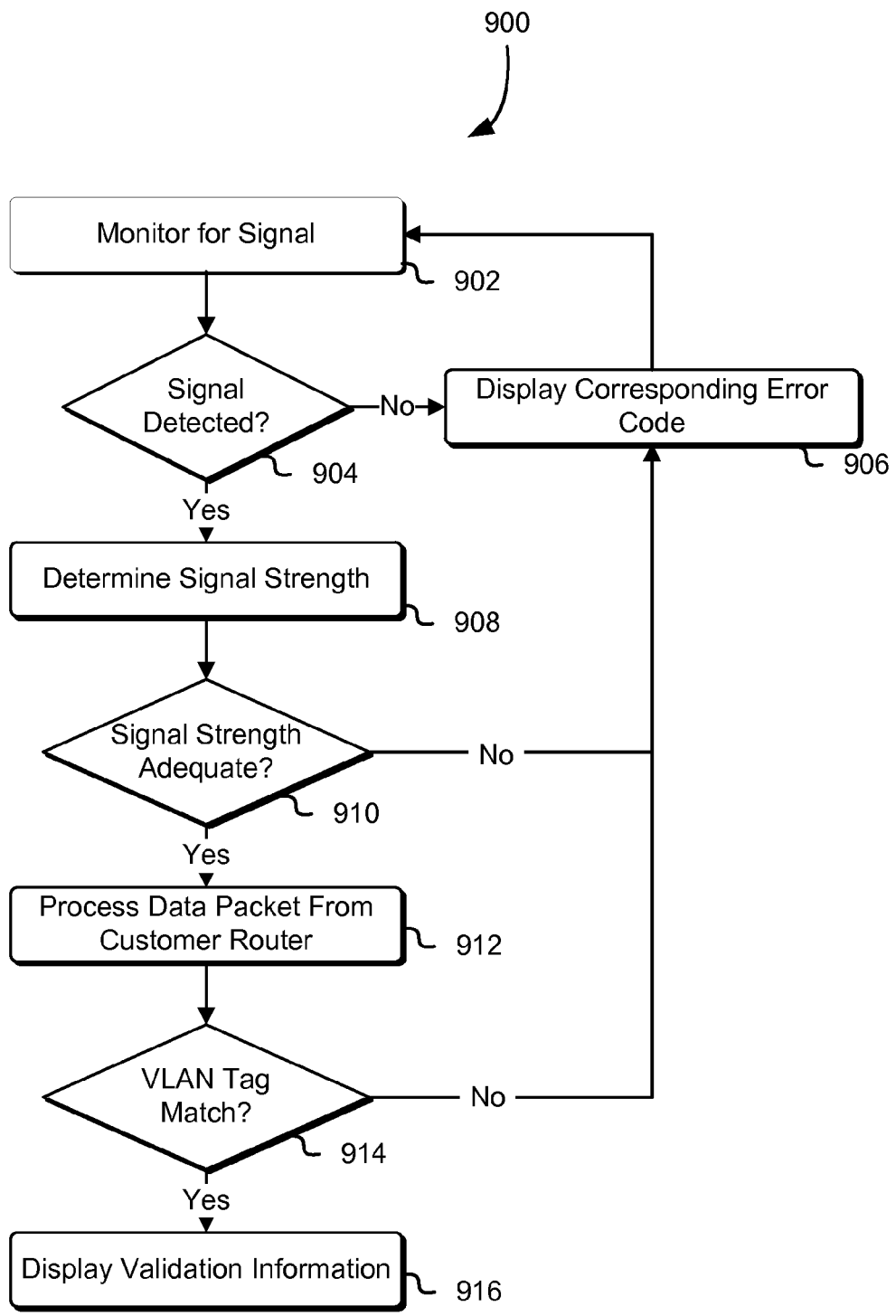
FIG. 9 shows an illustrative example of a process for determining whether a properly configured connection has been established in accordance with at least one embodiment.

Once the relevant customer and ticket information has been displayed, the device may be configured to perform one or more diagnostic tests. Accordingly, FIG. 9 is an illustrative example of a process for determining whether a connection between the customer router and the device has been made correctly. As illustrated above, after the data technician has reviewed the information displayed on the device, the data technician may plug a set of cables into the device in order to perform a series of diagnostic tests. Accordingly, the process 900 may include monitoring 902 for a signal that may be received through the ports on the device. The device may be configured to monitor for a signal at any time. For instance, once a data technician has powered on the device, the device may be configured to continuously monitor for a signal, even if no cables are plugged into the ports on the device. Alternatively, the device may be configured to monitor for a signal only if the device detects that a set of cables are plugged into the device ports or if the data technician has submitted a request through an appropriately configured API call to perform a series of diagnostic tests on the connection.

As the device continues to monitor for a signal, the device may be configured to determine 904 whether a signal has been detected. As noted above, the device ports may be configured to be unidirectional such that only one port may be configured to transmit data while the other port may be configured to receive data. Thus, if the cables connected to the customer router are plugged into the device incorrectly, the device may not detect a signal. Similarly, if the customer router is not in operation, the device may also not detect a signal. Accordingly, the device may be configured to display 906 an error code if a signal has not been detected by the device. The error code may include a number that the data technician is familiar with and may be used to identify the specific error the device has encountered. Alternatively, the error code may be more descriptive, such that the displayed error includes sufficient information that a data technician may use to take any appropriate steps to correct the problem.

Once the data technician has addressed the error, the device may be configured to continue monitoring 902 for a signal.

The device may be configured such that, if there is a signal detected by the device, the device may be used to determine 908 the signal strength. As noted above, the computing resource service provider router may have a set dynamic range for which it may receive a signal and decode the data from the signal. For instance, if the signal strength is too low, the computing resource service provider may not be able to detect and decode the data being transmitted by the customer. Alternatively, if the signal strength is too high, the signal may damage the computing resource service provider router. The device may be configured to display the signal strength to provide the data technician with an additional metric for evaluating the signal.

Thus, the device may be configured to determine 910 whether the signal strength is adequate for the connection between the customer router and the computing resource service provider router. Accordingly, if the signal strength is outside of the dynamic range for the computing resource service provider router, the device may be configured to display 906 an informative error message such that the data technician may read the error message and determine whether the signal strength is too high or too low. The data technician may then install an attenuator or an amplifier, depending on whether the signal strength was too high or too low, respectively. Once the data technician has taken the appropriate actions to address the displayed error code(s), the device may continue to monitor 902 for a signal and keep performing diagnostic tests.

If no issues with signal exist or any existing issues with the signal have been addressed such that the signal has been validated as being adequate, the device may be configured to process 912 a data packet from the customer router. For example, the data technician may interact with the device to submit a request to the customer through the customer router for a sample data packet. For instance, the device may be configured to transmit, through the cables plugged into the device, a data packet that may comprise a series of executable instructions. The executable instructions may be used to have one or more customer computing systems generate a data packet that is then transmitted, over the cables, to the device. This data packet may comprise a VLAN tag associated with the customer, an IP address associated with the customer computing systems and any other information the data technician may need to validate the connection. Alternatively, the device may be configured to automatically submit executable instructions to the customer computing systems once the signal has been deemed adequate. Accordingly, the data technician may not need to interact with the device to obtain 710 the data packet from the customer.

As noted above, the data packet transmitted by the customer router and to the device may contain certain information, such as a customer IP address and a VLAN tag. It is at this point that the device may be configured to determine 914 whether the VLAN tag in the data packet matches the expected customer VLAN tag provided by the computing resource service provider. The VLAN tags may be consistent with the IEEE 802.1Q networking standard. As noted above, the device may or may not display the expected and actual customer VLAN tags depending on any customer security protocols in place. For instance, if the data technician does not have authorization to see certain customer information and data, the device may be configured to only display whether the VLAN tags match. For example, if the VLAN tags match, the device may be configured to display a green circle. Alternatively, if the VLAN tags do not match, the device may be configured to display a red circle. In another example, as illustrated in FIGS. 3 and 4, the device may display an "OK" message if the VLAN tags match or an error message if the VLAN tags do not match. While the methods noted above for displaying the status of a VLAN tag comparison are extensively throughout the present disclosure for the purpose of illustration, the scope of the present disclosure is not necessarily limited to the processes explicitly noted herein.

If the VLAN tags do not match, the cables plugged into the device may not belong to the correct customer. Accordingly, the device may be configured to display 906 an error message as illustrated above. Based on the error message on the display, the data technician may disconnect the cables from the device and replace the cables with a different set of cables. The device may continue to monitor 902 for a signal. The data technician may connect the different set of cables into the device and perform another series of diagnostic tests to determine whether the current set of cables provide an adequate signal and, if so, whether the cables are associated with the correct customer. If, however, the VLAN tags do match, the device may be configured to display 916 all validation information. Accordingly, the data technician may disconnect the cables from the device and connect them to the computing resource service provider router.

Figure 10:
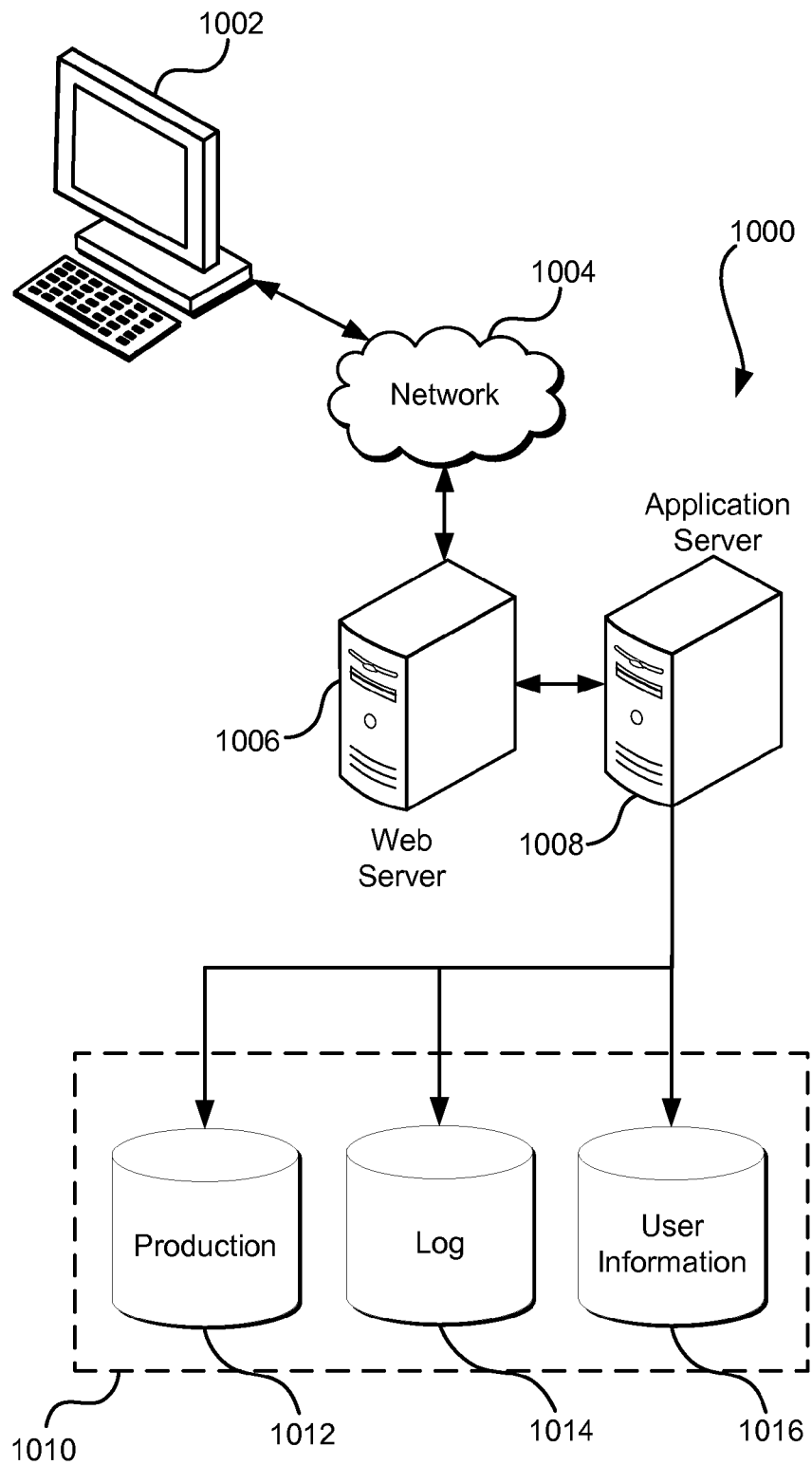
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A handheld fiber-optic diagnostic device comprising:
   a housing configured to allow the handheld fiber-optic diagnostic device to be held by a human hand;
   a port configured to removably receive a fiber-optic cable from outside of the housing;
   a display unit engaged with the housing so as to be visible from outside of the housing;
   a transceiver configured to access a system of a service provider;
   one or more processors that are operatively coupled with the display unit, the transceiver and the port; and
   memory including instructions executable by the one or more processors that when executed by the one or more processors cause the one or more processors to:
      receive a first set of information that is based at least in part on optical signals transmitted through the fiber-optic cable removably received by the port;
      receive a second set of information from the transceiver based at least in part on information received from the system of the service provider;
      determine, based at least in part on the second set of information, one or more security protocols for displaying diagnostic information through the display; and
      cause the display to display the diagnostic information in accordance with the one or more security protocols, the diagnostic information based at least in part on the first set of information, the second set of information and one or more analyses performed based at least in part on the first set of information and the second set of information.

2. The handheld fiber-optic diagnostic device of claim 1 wherein:
   the first set of information includes information extracted from a data packet that is received from optical signals transmitted through a fiber-optic cable connected to a customer router and signal strength based at least in part on the optical signals;
   the one or more processors further analyze the data packet and extract information from the data packet; and
   the diagnostic information displayed on the display includes the information from the data packet and the signal strength.

3. The handheld fiber-optic diagnostic device of claim 2 wherein the data packet includes a virtual local area network tag associated with a customer of the service provider.

4. The handheld fiber-optic diagnostic device of claim 1, wherein the second set of information includes an expected virtual local area network tag associated with a customer of the service provider, information for identifying the customer of the service provider and information regarding a service ticket.

5. The handheld fiber-optic diagnostic device of claim 1, wherein the one or more security protocols cause the display to not display diagnostic information based at least in part on the one or more security protocols.

6. The handheld fiber-optic diagnostic device of claim 1, the transceiver is operatively configured to access the system of the service provider using one or more wireless communications protocols.

7. A diagnostic device comprising:
a housing;
a port configured to removably receive a cable from at least a pair of cables of a communication circuit that each have a separate connector;
a display unit engaged with the housing so as to be visible from outside of the housing;
one or more processors that are operatively coupled with the display unit and the port; and
memory including instructions executable by the one or more processors that when executed by the one or more processors cause the one or more processors to:
receive a signal through the cable that encodes information;
extract the encoded information from the signal;
analyze, based at least in part on a set of information received from a remote system, the encoded information;
determine, based at least in part on the set of information received from the remote system, one or more security protocols for displaying information through the display; and
cause the display to display, in accordance with the one or more security protocols, information that distinguishes the cable from one or more remaining cables of the at least a pair of cables, information that includes the encoded information and information based at least in part on the comparison between the encoded information and the set of information received from the remote system.

8. The diagnostic device of claim 7, wherein:
the cable is a fiber-optic cable; and
the diagnostic device is configured to perform diagnostic tests on a fiber-optic connection.

9. The diagnostic device of claim 7, wherein:
the diagnostic device further comprises a transceiver that is configured to communicate with the remote system using one or more wireless communications protocols; and
the set of information received from the remote system is received through the transceiver.

10. The diagnostic device of claim 9, wherein the analysis includes performing one or more tests to compare the set of information that is received through the transceiver and the information from the signal received through the cable.

11. The diagnostic device of claim 7, wherein the information displayed on the display indicates whether the cable is one from the at least a pair that is connected at one end to the transmission port of a customer router.

12. The diagnostic device of claim 7, wherein the information displayed on the display includes at least one of customer and service ticket information, signal characteristics, or one or more error messages if the device detects one or more errors.

13. A computer-implemented method for diagnosing a connection, comprising:
under the control of a portable diagnostic device configured with executable instructions,
determining if one or more signals are being transmitted through a cable;
displaying a message on a display unit when no signals are being transmitted through the cable;
receiving, to the portable diagnostic device, one or more signals through the cable;
extracting a first set of information from the one or more signals;
obtaining a second set of information from a remote system;
determining, based at least in part on the second set of information from the remote system, one or more security protocols for displaying information through the display;
performing one or more tests based at least in part on the first set of information and the second set of information; and
displaying results of the one or more tests on the display unit of the portable diagnostic device in accordance with the one or more security protocols.

14. The computer-implemented method of claim 13, wherein obtaining the second set of information from a remote system is receiving the second set of information through a transceiver on the portable diagnostic device.

15. The computer-implemented method of claim 13, wherein the one or more tests includes comparing the set of information from the one or more signals and the second set of information and determining one or more characteristics of the one or more signals.

16. The computer-implemented method of claim 13, wherein the set of information from the one or more signals includes one or more data packets collectively comprising one or more virtual local area network tags associated with a customer and signal characteristics.

17. The computer-implemented method of claim 13, wherein the second set of information includes customer and service ticket information and an expected virtual local area network tag associated with the customer.

18. The computer-implemented method of claim 13, wherein the one or more security protocols cause the display to prevent information from the first set of information from being displayed if the information does not satisfy the one or more security protocols.

19. A non-transitory computer-readable storage medium having stored thereon instructions that, when executed by one or more processors of a portable diagnostic device, cause the portable diagnostic device to:
process one or more signals received through at least one cable from a set of cables connected to obtain information encoded by the one or more signals;
process a set of information from a remote system;
determine, based at least in part on the set of information, one or more security protocols for displaying information through a display;
perform one or more tests based at least in part on the encoded information and the set of information; and cause the display to display information based at least in part on results from the one or more tests and in accordance with the one or more security protocols.

20. The non-transitory computer-readable storage media of claim 19, wherein the set of information from the remote system is received through a transceiver on the portable diagnostic device.

21. The non-transitory computer-readable storage media of claim 19, wherein the set of information includes information based at least in part on a customer of a remote system, a description of a task to be performed and an expected virtual local area network tag associated with the customer.

22. The non-transitory computer-readable storage media of claim 21, wherein the information based at least in part on the one or more tests includes characteristics of the one or more signals and a comparison of the virtual local area network tag from the encoded information and the expected virtual local area network tag.

23. The non-transitory computer-readable storage media of claim 19, wherein the one or more security protocols cause the display to not display information that does not satisfy the one or more security protocols.

24. The non-transitory computer-readable storage media of claim 19, wherein the one or more tests are diagnostic tests for determining signal characteristics based at least in part on the one or more signals received through the at least one cable.

\* \* \* \* \*